No. 627,011. Patented June 13, 1899.
C. PRENTICE.
RETINOSCOPE.
(Application filed Mar. 11, 1899.)
(No Model.)
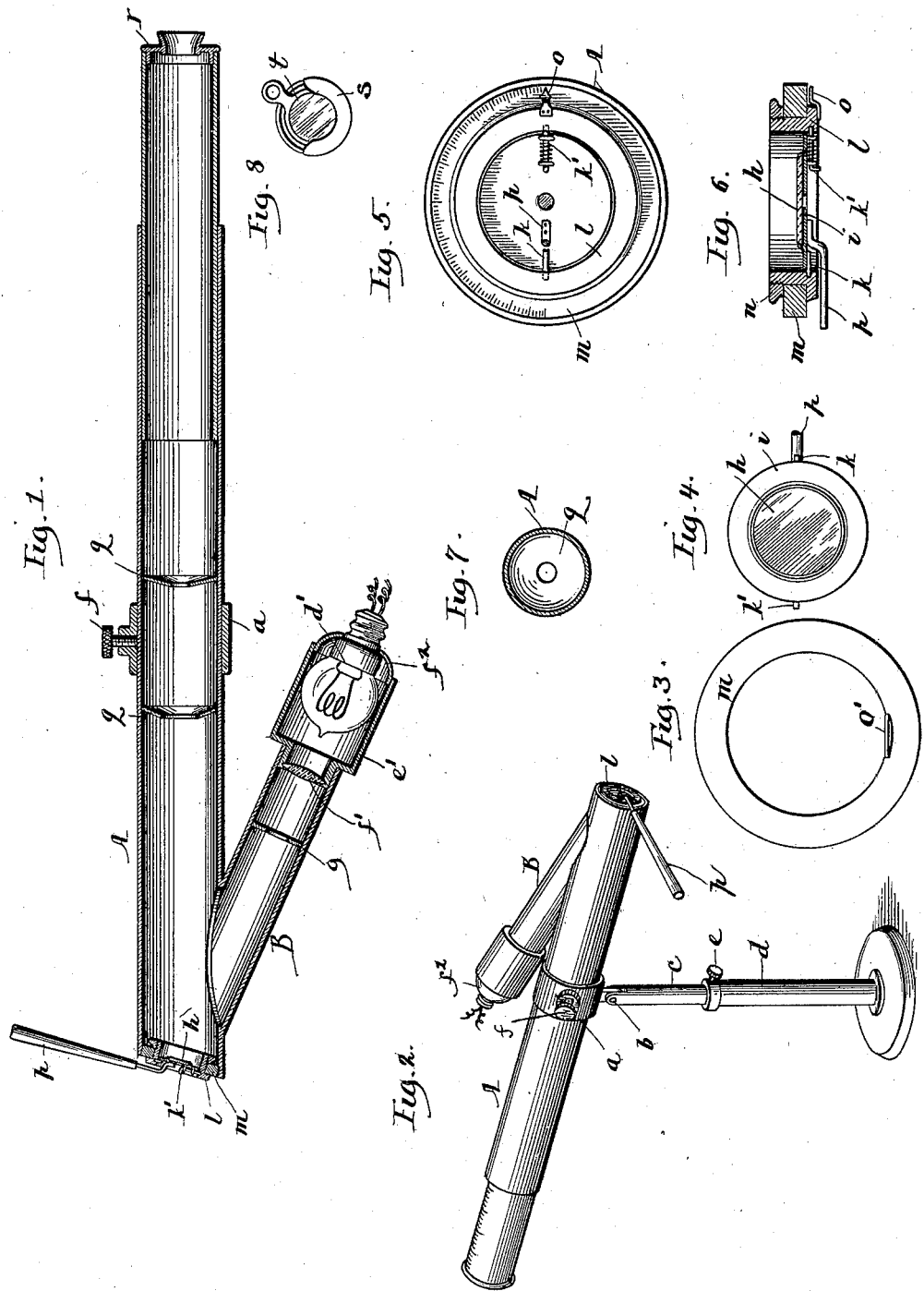
Witnesses:
Inventor:
Chalmers Prentice
By his Attorneys

UNITED STATES PATENT OFFICE.

CHALMERS PRENTICE, OF CHICAGO, ILLINOIS, ASSIGNOR TO THE GENEVA OPTICAL COMPANY, OF SAME PLACE.

RETINOSCOPE.

SPECIFICATION forming part of Letters Patent No. 627,011, dated June 13, 1899.

Application filed March 11, 1899. Serial No. 708,674. (No model.)

*To all whom it may concern:*

Be it known that I, CHALMERS PRENTICE, a resident of Chicago, in the county of Cook and State of Illinois, have invented certain new and useful Improvements in Retinoscopes, of which the following is hereby declared to be a full, clear, and exact description.

The invention designs to provide an improved form of instrument suited for use by oculists and others in making the "shadow test" for the detection of refractive errors in the eye of a patient.

The exact nature of the improvement will appear in detail from the description following and be more particularly pointed out by claims at the conclusion thereof.

On the drawings like parts bear like designation throughout.

Figure 1 is a view in horizontal section through the body of the instrument; Fig. 2, a perspective of the device mounted upon its supporting-stand; Fig. 3, an elevation of the mirror socket-piece detached; Fig. 4, a like view of the pintle-disk with the mirror secured thereto; Fig. 5, an elevation of the mirror socket-piece, ring-frame, and adjuncts united; Fig. 6, a central sectional view of Fig. 5; Fig. 7, a detail of one form of diaphragm; Fig. 8, a detail of the seat for a neutralizing-lens at the patient's eyepiece.

Near the operator's end the main or focal tube A is united with a lateral light-supply tube B, which opens into it at a slight angle. The two tubes together constitute the body of the instrument and may be conveniently sustained at desired height by means of the band $a$, which encompasses tube A and pivots frictionally at $b$ to the movable leg $c$, socketed in the usual sleeve of base-stand $d$. Set-screw $e$ on the sleeve retains the instrument in adjusted position, while by relaxing screw $f$ at band $a$ it becomes feasible to turn tube A within said band, thus shifting the tube B from right to left or to some intermediate point in its relation to the main tube.

Internally each tube A B is coated "dead black," and at its open end tube B has suitable provision for the supply of light-rays from some convenient source. As here shown, the light-supply comes from an incandescent electric lamp $d'$, incased in a holder $e'$, which slips onto the terminal of tube B. A reflector $f^2$ at the back of the lamp aids in directing the rays through the tube. A condensing-lens $f'$, interposed in tube B, may be used with advantage to project the pencil of light-rays onto the mirror $h$. Diaphragm $g$, set across tube B, has a central hole therein to allow the pencil to pass, but being dead black acts to arrest and absorb the dispersed light, which must otherwise affect the desired clearness of definition.

Mirror $h$ is sustained by tube A at a slight incline, so that the rays proceeding from tube B are reflected by the mirror and are projected in turn along tube A toward the eye of the patient. Mirror $h$ may consist of a round bit of silvered glass, a small central area or peep-hole being left uncovered, as in the ordinary hand-retinoscope. The mirror can be plane, but is generally made concave, so as to direct the ray onto the fundus of the eye at the far end of tube A. If the tube be, *e. g.*, twenty inches in length, the use of a mirror or like focal power—say two diopters—will relieve the operator from the need of making corrections for this length in arriving at a final estimate respecting the strength of the lenses to be prescribed. The mirror is fastened in some suitable fashion to the flat metal disk $i$, furnished with journal-pintles $k\ k'$, which seat and turn in holes at ring-frame $l$. By making one of the pintles—*e. g.*, $k'$—like a spring-bolt the disk $i$ can be dismounted or be reset in place at will. Ring-frame $l$ nicely fits within the hole of an annular socket-piece $m$. Keeper $n$, threaded to frame $l$, retains it in place, but still allows for ready rotation of the frame within the hole at socket-piece $m$. The frame carries a pointer $o$ to denote the degree of rotation as disclosed by graduated scale on the face of annulus $m$. At $o'$ on its inner periphery the annulus $m$ is incised and pried slightly inward to form a flat spot in its otherwise round perimeter. Ring-frame $l$ bears frictionally against the spot and is held thereby against premature shift.

The annular socket-piece $m$ is snugly fitted at its rim into the operator's end of focal tube A. By means of handle $p$, soldered or otherwise secured to disk $i$, it is seen that the inclination of the mirror can be changed at will on rocking the disk about its pintles $k\ k'$. The handle $p$ can also be used to rotate the ring-frame $l$ in its seat, thus bringing the pintles $k\ k'$ into a different plane and necessarily modifying the effect observed on rocking the mirror at the new relation. The device has the same range of adjustment as the hand-retinoscope, but becomes more definite because the degree of rotary movement assigned to ring-frame $l$ can be precisely fixed and be repeated when desired. All internal parts exposed to the light-rays, save only the mirror-face, are to be coated dead black to prevent reflection.

For convenience the length of focal tube A is generally constant—e. g., twenty inches—although it can be made, as shown, in telescoping sections to permit of various adjustment, if desired. The graduated scale at the sections affords proper data for the calculations of the operator in allowing for differences in length of the tube.

One or more diaphragms $q$, preferably made of conoidal ring shape, may be set at intervals along the tube. Each diaphragm is coated dead black. If more than one be used, the dispersed rays are better excluded and absorbed, only the central pencil of light being projected through the tube onto the eye of the patient. A set of diaphragms each having an opening of different size can be provided, one diaphragm being inserted as a substitute for another, if deemed desirable.

The eyepiece $r$ may consist of a simple ring, with central hole, set into the end of tube A; or a fitting $s$ may be used at times, as the operator may prefer, the fitting being adjusted to tube A and furnished with an open seat for test-lens $t$, Fig. 8. By inserting several lenses of different curvature the operator is eventually able to prescribe a lens suited to correct the refractive errors of the eye under examination.

The improved apparatus dispenses with the need of a dark room. The eye to be examined rests at the end of the focal tube and is exposed only to the confined rays projected through the tube. The image reflected at the fundus of the eye and the shadow which accompanies it become clearly defined and are capable of nicest observation and study under various manipulation of the operator's mirror. The free eye can be directed to a distant object, which results in further distention by sympathy of the pupil of the eye under treatment. A smaller pupil can be examined by aid of the confined light without resort to mydriatics. A plus lens over the free eye induces a certain amount of dilation and by sympathy induces corresponding dilation in the eye confined to the focal tube. The plus lens causes the ciliary to relax in the effort to see, and a like relaxation of the ciliary in the confined eye, reveals a greater amount of latent hypermetropia than could otherwise be noted.

Obviously the details of structure can be varied by the knowledge of the skilled without essential departure from the invention.

Having thus described my invention, what I claim as new, and desire to secure by Letters Patent, is—

1. In retinoscopes, the combination with the focal tube, of the light-supply tube united at an angle thereto, and the tilting mirror with suitable aperture therein; said mirror being internally located to receive the light-rays and project the same along the focal tube to the patient's eyepiece, substantially as described.

2. In retinoscopes, the combination with the focal tube, of the light-supply tube united at an angle thereto, and the inclined, rotatable, tilting mirror with suitable aperture therein; said mirror being internally located to receive the light-rays and project the same along the focal tube to the patient's eyepiece, substantially as described.

3. In retinoscopes, the combination with the focal tube, of the light-supply tube united at an angle thereto, the inclined, tilting mirror to receive the light-rays and project the same along the focal tube, and the diaphragm interposed in said tube to obstruct and absorb the dispersed rays, substantially as described.

4. In retinoscopes, the combination with the focal tube and with the annular socket set therein, of the ring-frame rotatably mounted in the socket, and the mirror-disk secured by pintles to obstruct and rock in said frame, substantially as described.

CHALMERS PRENTICE.

Witnesses:
JAMES H. PEIRCE,
ALBERTA ADAMICK.